(No Model.) 7 Sheets—Sheet 1.
C. L. RUEHS.
SANDPAPERING MACHINE.
No. 497,895. Patented May 23, 1893.
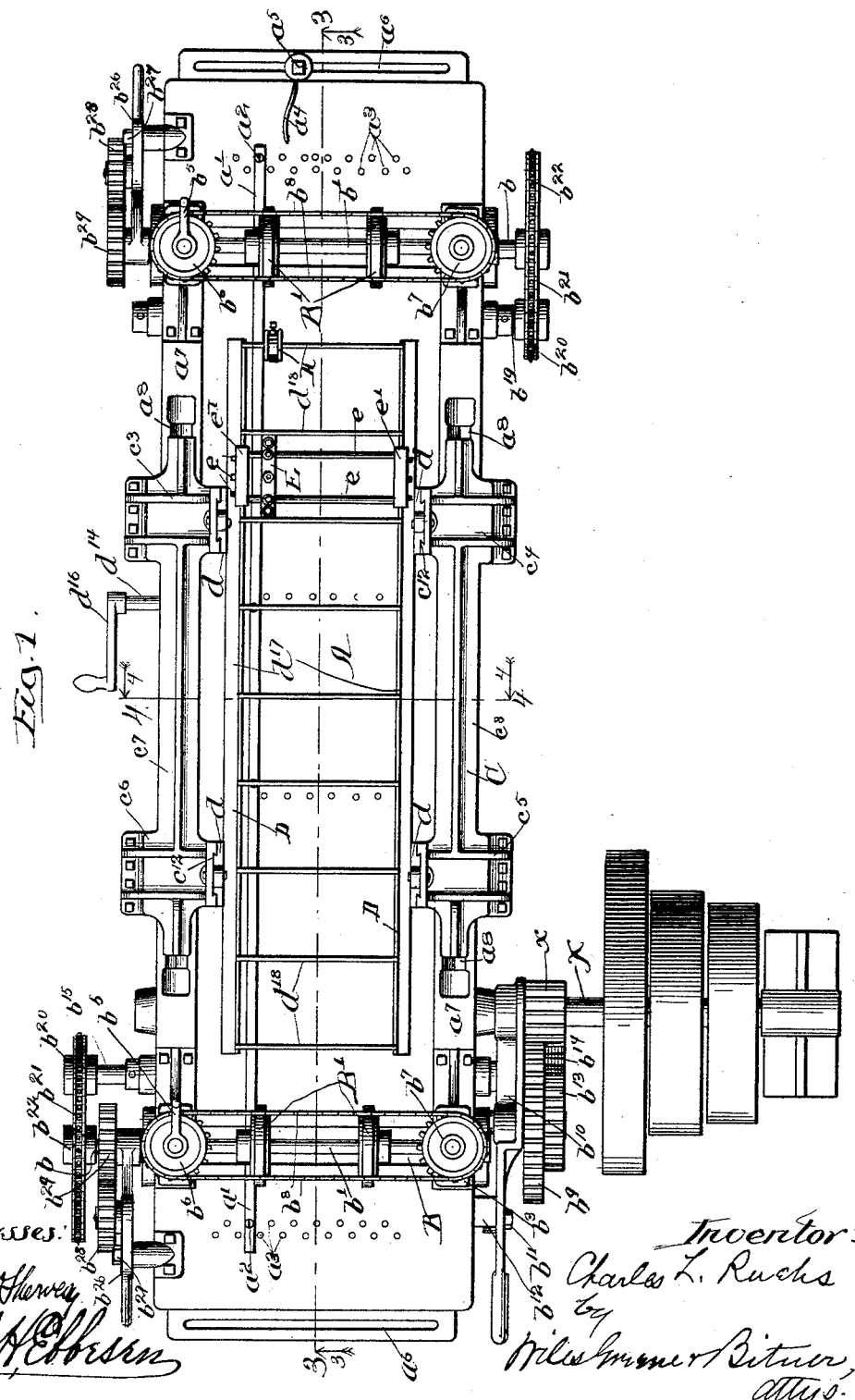

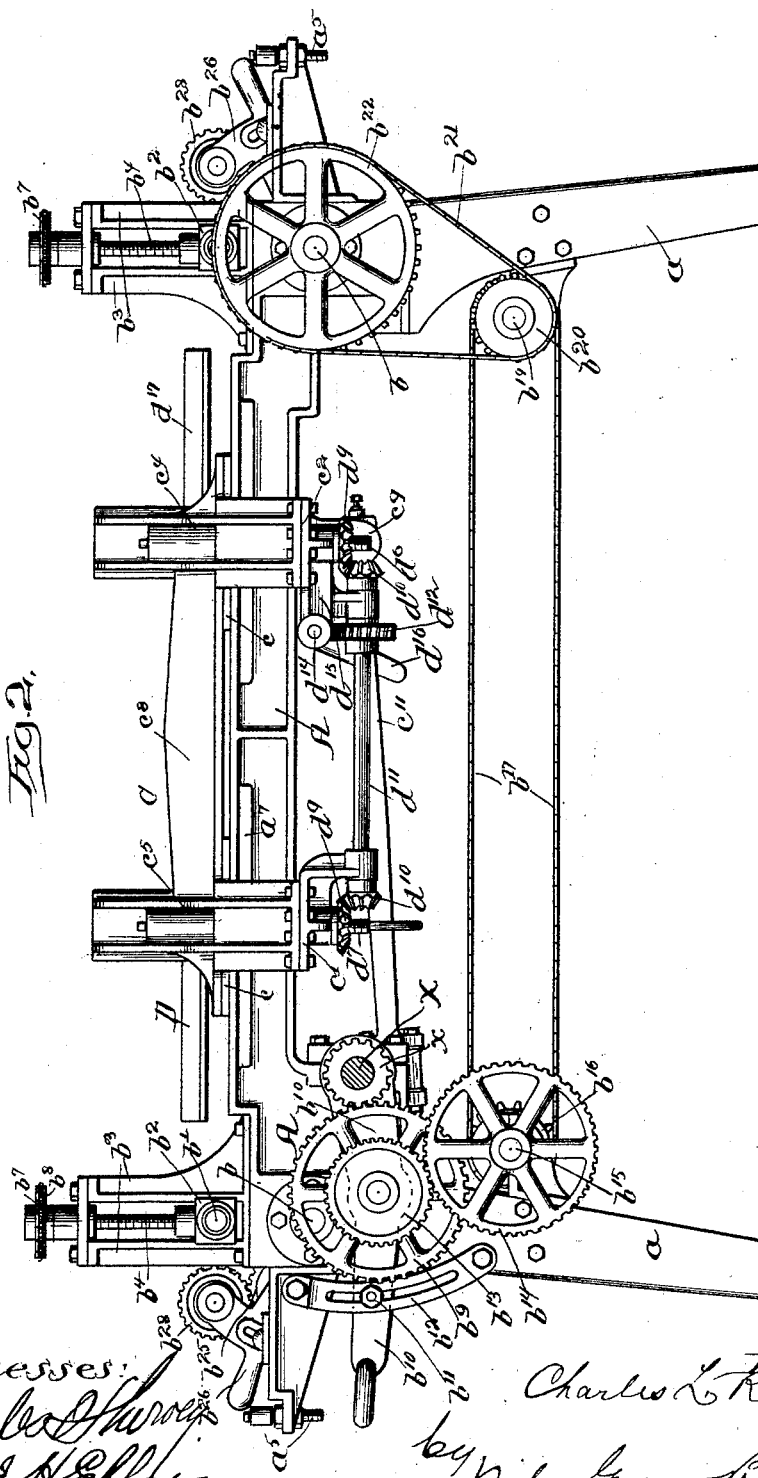

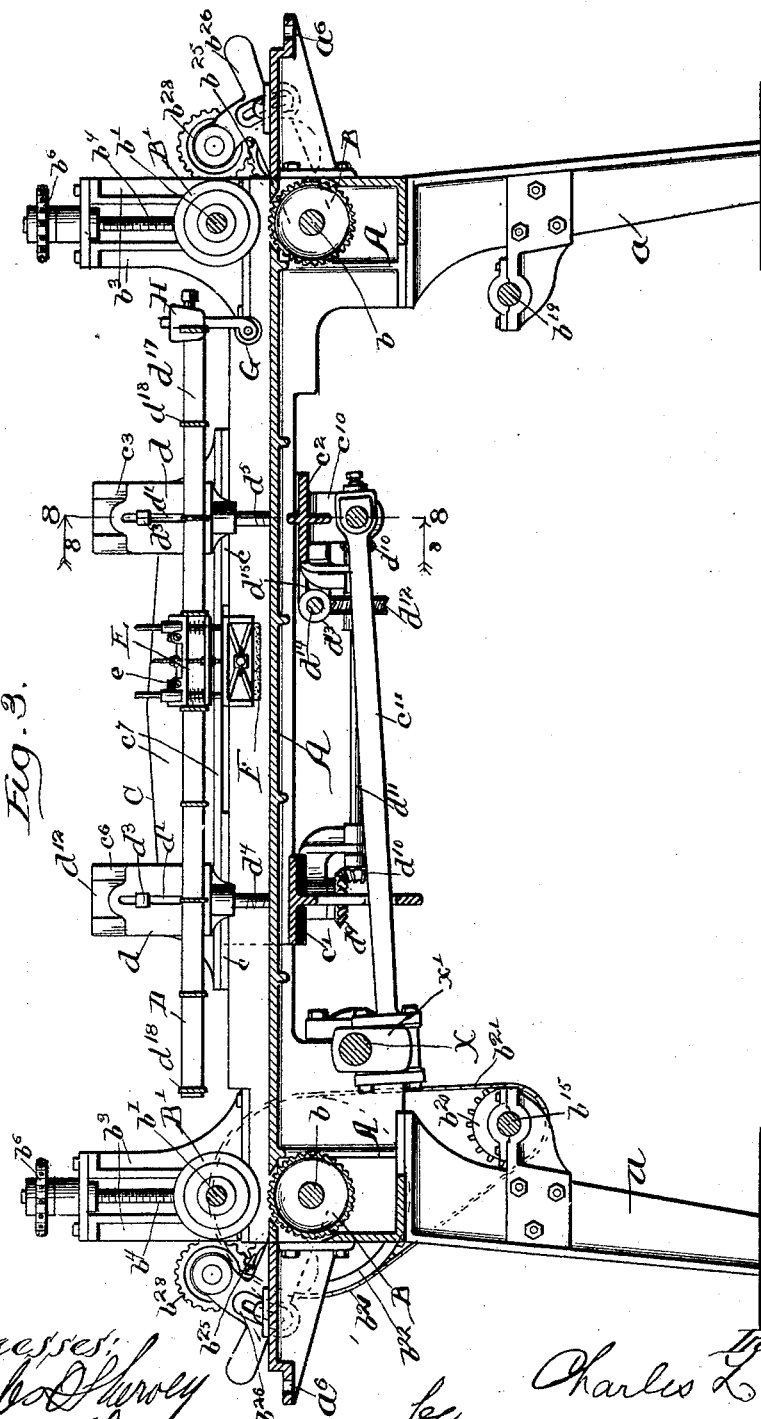

(No Model.) 7 Sheets—Sheet 4.
C. L. RUEHS.
SANDPAPERING MACHINE.
No. 497,895. Patented May 23, 1893.
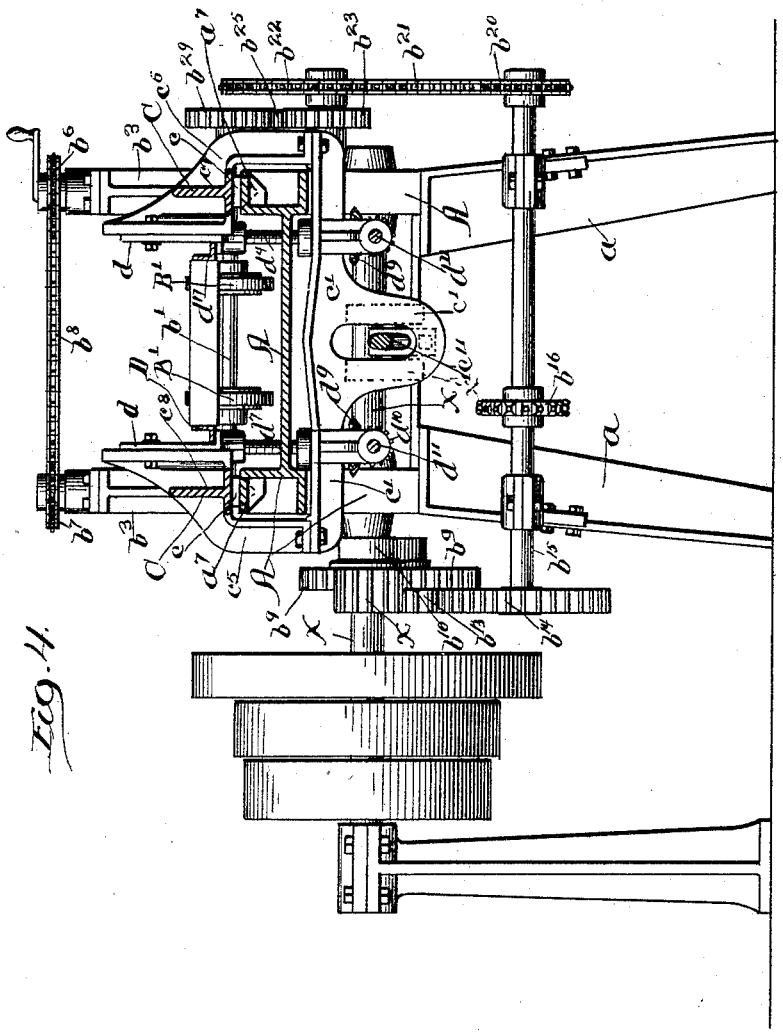

(No Model.) 7 Sheets—Sheet 5.
C. L. RUEHS.
SANDPAPERING MACHINE.
No. 497,895. Patented May 23, 1893.
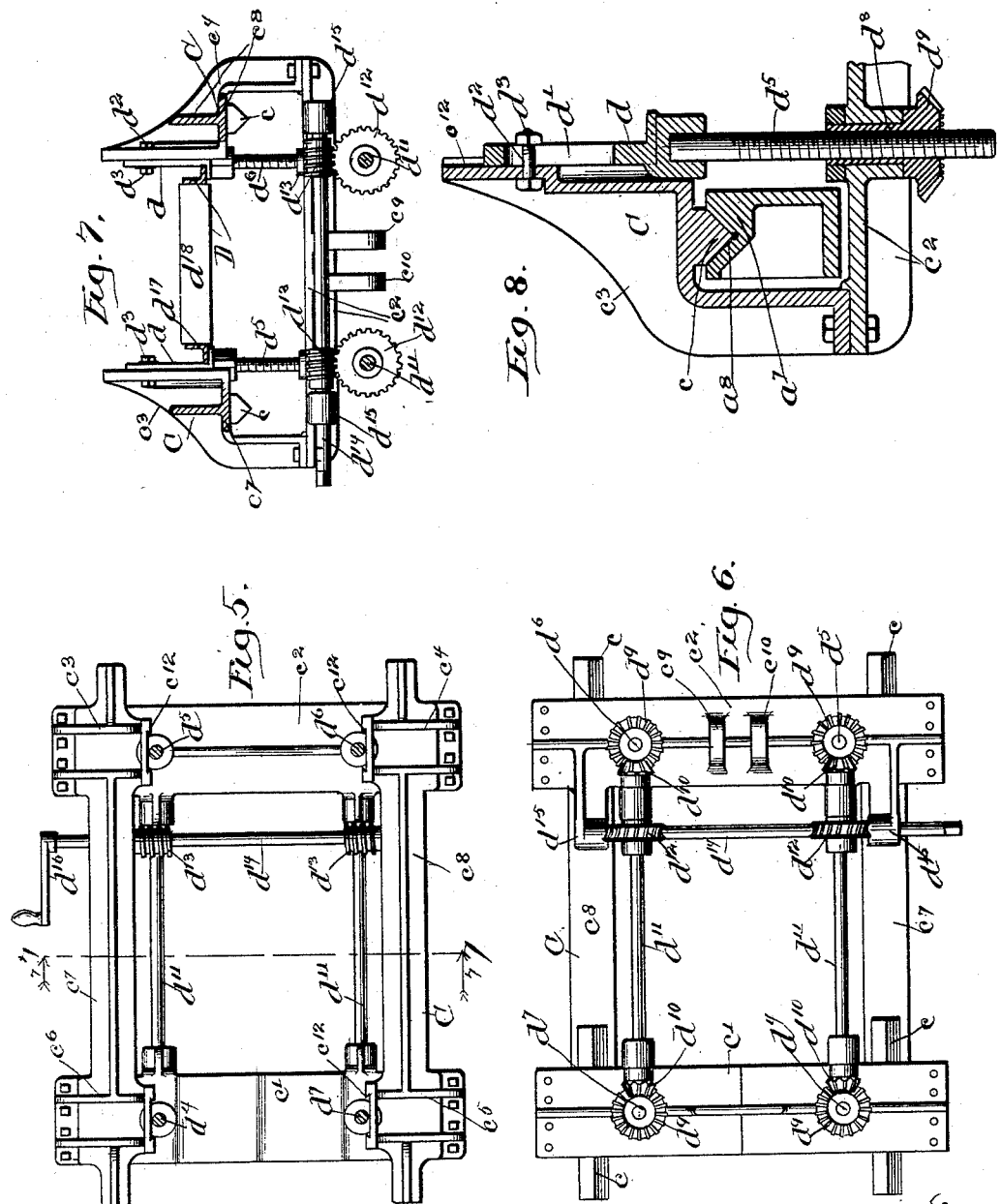

(No Model.) 7 Sheets—Sheet 6.

C. L. RUEHS.
SANDPAPERING MACHINE.

No. 497,895. Patented May 23, 1893.

Witnesses:
Charles Shewey
A. J. H. Esbesen

Inventor:
Charles L. Ruehs,
by Miles Werner Bitner,
attys.

THE NORRIS PETERS CO., PHOTO-LITHO., WASHINGTON, D. C.

(No Model.) 7 Sheets—Sheet 7.
C. L. RUEHS.
SANDPAPERING MACHINE.

No. 497,895. Patented May 23, 1893.

Witnesses: Charles Shewey, A. H. Ebbesen.

Inventor: Charles L. Ruehs.

UNITED STATES PATENT OFFICE.

CHARLES L. RUEHS, OF CHICAGO, ILLINOIS.

SANDPAPERING-MACHINE.

SPECIFICATION forming part of Letters Patent No. 497,895, dated May 23, 1893.

Application filed February 21, 1893. Serial No. 463,238. (No model.)

*To all whom it may concern:*

Be it known that I, CHARLES L. RUEHS, a citizen of the United States of America, residing at Chicago, in the county of Cook and State of Illinois, have invented certain new and useful Improvements in Sandpapering-Machines, of which the following is a specification.

My invention relates to certain improvements in sandpapering machines having to do principally with the arrangement and construction of the different parts with reference to compactness and handiness in operating.

The improvements consist mainly in details of construction which will be fully described, together with such auxiliary devices as may be necessary to make up a complete machine; after which the essential portions, which I believe to be new, will be clearly pointed out in the claims.

My invention is illustrated by means of fifteen figures, of which—

Figure 9:
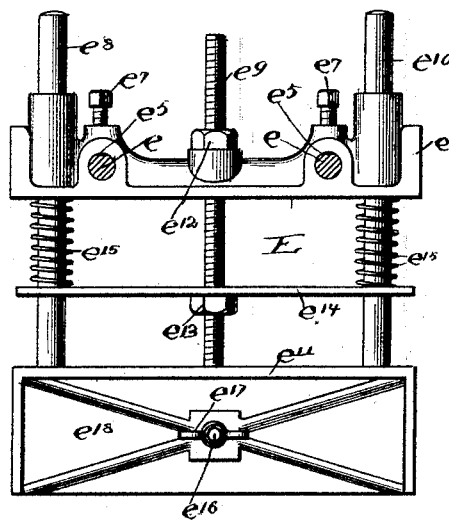
Figure 10:
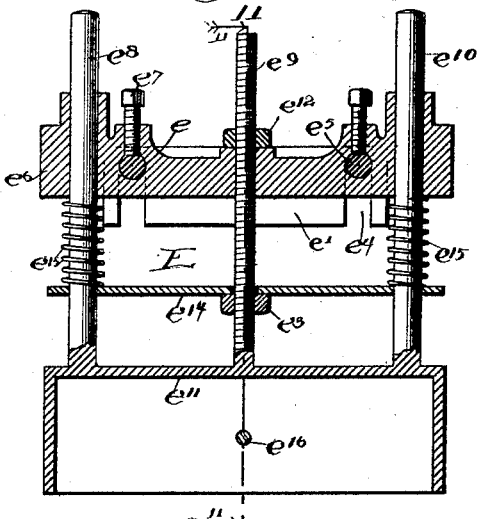
Figure 11:
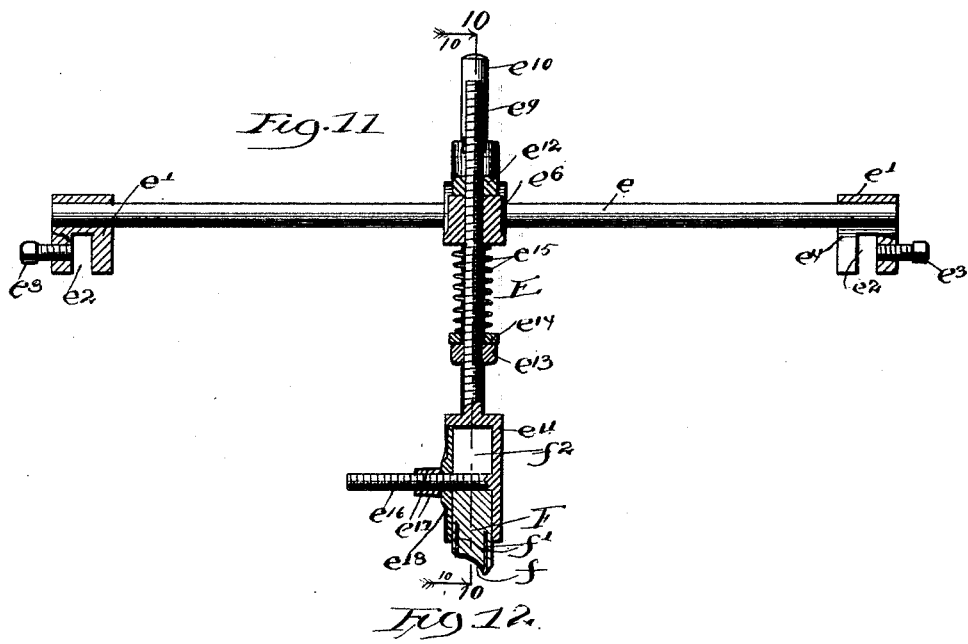
Figure 12:
Figure 15:
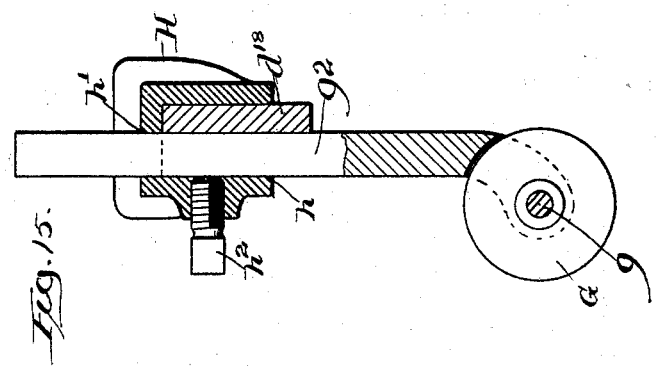
Figure 14:
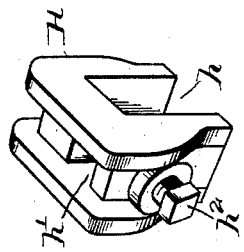
Figure 13:
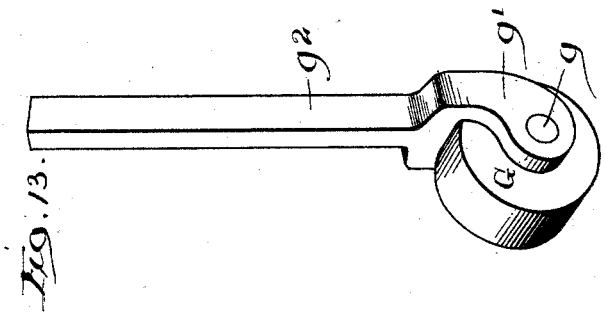

Figure 1 is a plan view of a complete machine. Fig. 2 is a side elevation looking from the lower side in Fig. 1, the band pulleys being removed to reveal parts which would otherwise lie behind them. Fig. 3 is a vertical longitudinal section in line 3—3, of Fig. 1, looking in the direction of the arrow 3. Fig. 4 is a transverse vertical section in line 4—4, of Fig. 1, looking in the direction of the arrow, 4. Fig. 5 is a detail plan of an oscillating frame which carries the box in which are mounted the rubbing blocks. Fig. 6 is an under view of said frame. Fig. 7 is a detail transverse vertical section in line 7—7, of Fig. 5, looking in the direction of the arrow 7, showing said frame in connection with other portions of the machine. Fig. 8 is a detail vertical section in line 8—8, of Fig. 3, looking in the direction of the arrow 8. Fig. 9 is a detail elevation of a block-carrying device. Fig. 10 is a section of said device in line 10—10 of Fig. 11, looking in the direction of the arrow 11. Fig. 11 is a section of the same device in line 11—11, of Fig. 10. Fig. 12 is a detail elevation of a clamping device shown in Fig. 11. Fig. 13 is a perspective of an adjustable clamping roller shown in Figs. 1 and 3. Fig. 14 is a perspective of a clamping device by which said roller is held in place; and Fig. 15 is a section showing the manner of fastening the roller to the block-carrying frame.

My machine consists, first, of a solid bed suitably mounted and provided with guiding devices which may be adjusted to guide the molding in any path desired across the top of the bed; second, in two series of feed rollers mounted at the opposite ends of the bed and provided with driving gear connecting them with the main driving shaft; third, a reciprocating frame sliding in guides upon the bed, and also connected by suitable gear with the main driving shaft; fourth, a vertically adjustable frame or box mounted upon the reciprocating frame; fifth, a series of block-holding devices mounted upon the adjustable box and themselves adapted to hold blocks and to enable the latter to be adjusted therein; sixth, a series of blocks covered with sandpaper and fitted to different portions of the molding; seventh, adjustable guiding rollers adapted to be fastened to the adjustable frame to hold the molding in place beneath the same.

The bed is shown at A (see Fig. 1.) supported upon legs, $a$. To guide the molding across the top of the bed, bars, $a'$, are fastened to the latter by means of bolts, $a^2$, fitted to holes, $a^3$, in the bed. The great number of these holes allows of a nice adjustment of the bars, and also of the use of as many bars as necessary to sandpaper two or more pieces of molding at once. To hold the molding against these bars, swinging arms, $a^4$, are clamped to the bed by means of a bolt, $a^5$, sliding back and forth in a slot, $a^6$, in the bed, so that a wide adjustment may be effected by sliding the bolt one way or the other in the slot, and a limited adjustment by pivoting the arm upon the bolt. These arms are preferably curved and as many should be employed as bars $a'$.

The feed rollers are shown in the section of Fig. 3. The lower is a cylindrical roller, B, having a longitudinally corrugated surface, and the upper consists of a series of rubber faced wheels or disks, B', laterally adjustable so as to bring them over whatever portions of the molding may be desired. The shaft, $b$, of the roller, B, is journaled in the bed frame, and the shaft, $b'$, of the rollers, B', is journaled at its opposite ends in blocks, $b^2$, (see Fig. 2) adapted to slide up or down in brackets, $b^3$, secured to the bed, and said blocks are controlled by means of screws, $b^4$, one of which is turned by a crank, $b^5$, (see Fig. 1) and the other by means of sprocket-wheels, $b^6, b^7$, and a chain, $b^8$. The power is applied to the feed rollers from the main driving shaft, X, by means of a pinion, $x$, thereon (see Fig. 2,) which pinion meshes with a loose gear, $b^9$, upon a swinging frame, $b^{10}$, pivoted about the shaft, X, and held in position by means of a bolt and nut, $b^{11}$, by means of which the frame may be clamped to a bracket, $b^{12}$, secured to the bed frame. The gear, $b^9$, has rigidly connected therewith a pinion, $b^{13}$, in mesh with a gear, $b^{14}$, fast upon a shaft, $b^{15}$, journaled in the bed frame. The mounting of the loose gears, $b^9$, $b^{13}$, upon the swinging frame enables the gear, $b^{13}$, to be changed to substitute either a larger or smaller gear to vary the speed of the feed rollers. Upon the shaft, $b^{15}$, is fastened a sprocket-wheel, $b^{16}$, carrying a chain, $b^{17}$, leading to a second sprocket-wheel, $b^{18}$, upon a shaft, $b^{19}$, journaled in the opposite end of the bed frame. Upon this shaft, $b^{19}$, is a second sprocket-wheel, $b^{20}$, which hides the first sprocket-wheel in the figure (Fig. 2) and a chain, $b^{21}$, leads from the sprocket-wheel, $b^{20}$, to a gear, $b^{22}$, upon one of the shafts, $b$, of one of the rollers, B. This gear $b^{22}$, is shown in Fig. 2 at one end, but lies upon the other side of the bed frame at the other end and is shown only in dotted lines in Fig. 3, and in plan view and end elevation in Figs. 1 and 4, respectively. The gearing between the gears, $b^{22}$, and the shafts, $b'$, upon which the upper feed rollers are carried is shown in Figs. 1 and 4, and is the same at both ends of the machine. The shafts, $b$, which are turned by the wheels, $b^{22}$, carry pinions, $b^{23}$, (see Fig. 4) in mesh with loose gears, $b^{25}$, (see Fig. 3) journaled upon arms, $b^{26}$, pivoted upon the shafts, $b$, and clamped to the frame by nuts, $b^{27}$, (see Fig. 1.) These arms also carry other loose gears, $b^{28}$, (see Figs. 1 and 2) in mesh with gears, $b^{29}$, (see Fig. 1) upon the shafts, $b'$, of the upper feed rollers. The mounting of the loose gears, $b^{25}$, $b^{28}$, upon the pivoted arms, $b^{26}$, enables said gears to be adjusted when the upper feed rollers are raised or lowered to maintain the mesh between the gears, $b^{28}$ and $b^{29}$.

Looking at Figs. 4 and 8, the side rails of the bed frame are shown in section at $a^7$. In each of these side rails is formed a V-shaped groove, $a^8$, in which similarly shaped runners, $c$, (see Fig. 7) travel back and forth carrying a reciprocating frame, C. A plan of this frame is shown in Fig. 5, a bottom plan in Fig. 6, a section in line 7—7, Fig. 5, in Fig. 7, and a detail section of one side of the frame and of parts connected therewith in Fig. 8. This frame is made up of two cross pieces, $c'$, $c^2$, located beneath the bed of the machine, uprights, $c^3$, $c^4$, $c^5$, $c^6$, rising from these cross pieces and connected together in pairs by means of side pieces, $c^7$, $c^8$, above the bed of the machine, and carrying upon their under sides the V-shaped runners above mentioned. Upon the under surface of the cross piece, $c^2$, are two depending lugs, $c^9$, $c^{10}$, (see Fig. 6) between which is pivoted a pitman, $c^{11}$, (see Fig. 3) the other end of which is pivoted upon a crank, $x'$, in the middle portion of the driving shaft, X. The rotation of said shaft, therefore, slides the frame back and forth upon the runners giving a longitudinally reciprocating motion to the frame and all parts carried thereby.

The uprights, $c^3$, $c^4$, $c^5$, $c^6$, are provided upon their inner faces with dovetailed grooves, $c^{12}$, and a rectangular box, D, (see Fig. 1) is guided in these dovetailed grooves by means of uprights, $d$, $d$, $d$, $d$, provided with tongues fitted to the dovetailed grooves and slotted as seen in Fig. 8 at $d'$, to receive bolts, $d^2$, provided with clamping nuts, $d^3$, by means of which the uprights may be secured in any position desirable. This box, D, is moved up or down by means of four posts, $d^4$, $d^5$, $d^6$, $d^7$, (see Figs. 6, 7, and 8) fast in the uprights, $d$, and screw-threaded in thimbles $d^8$, journaled in the bed of the machine (see Fig. 8) and provided beneath the same with four miter-gears, $d^9$. These miter-gears are all geared together by means of miters, $d^{10}$, (see Fig. 6) arranged in pairs upon connecting shafts, $d^{11}$, journaled in brackets upon the cross pieces, $c^2$, $c'$, and bearing worm-gears, $d^{12}$, turned by worms, $d^{13}$, upon a shaft, $d^{14}$, journaled in brackets, $d^{15}$, upon the cross piece, $c^2$, and turned by means of a handle, $d^{16}$. When the box is to be raised or lowered, the nuts, $d^3$, are loosened and the box moved into its new position by turning the crank, $d^{16}$. The nuts, $d^3$, are then tightened up again, securely clamping the box in place.

The box, D, is made up of side pieces, $d^{17}$, and cross pieces, $d^{18}$, to strengthen it and space the side pieces apart. Upon this box is supported a series of block-holding devices, E, shown in Figs. 9, 10 and 11. These devices are carried by means of cross rods, $e$, (see Figs. 1 and 11) clamped to the sides, $d^{17}$, of the frame by means of clamps, $e'$, (see Fig. 12.) These clamps are provided with longitudinal slots, $e^2$, upon their under surfaces to receive the side pieces of the box and clamping screws, $e^3$, to tighten upon the latter. Near their ends they are also provided with transverse slots, $e^4$, also upon the under surfaces to receive the cross rods, $e$. These cross rods pass through holes, $e^5$, in the heads, $e^6$, of the block-holding devices and are clamped therein by means of screws, $e^7$. Passing vertically through the head are also three pins, $e^8$, $e^9$, $e^{10}$, all of which extend down and are extensions of a case, $e^{11}$, closed upon the top, both ends and one side, and adapted to receive a block such as will be hereinafter described. The pin, $e^9$, is screw-threaded and provided with two nuts, $e^{12}$, $e^{13}$, one above the head and the other below a cross bar, $e^{14}$, through the ends of which the pins, $e^8$, $e^{10}$, also extend. Between this cross bar and the under surface of the head are coiled springs, $e^{15}$, under tension and normally pushing downward upon the cross bar, $e^{14}$. All three of the pins, $e^8$, $e^9$, $e^{10}$, slide freely in the head, $e^6$, and the pins, $e^8$, $e^{10}$, also slide freely in the cross bar, $e^{14}$. As a result of this, the case, $e^{11}$, is kept down as far as the nut, $e^{12}$, will permit, unless a force is exerted to push it upward sufficiently to overcome the thrust of the spring, $e^{15}$. Extending laterally from the closed side of the case, $e^{11}$, is a pin, $e^{16}$, screw-threaded and provided with a thumb nut, $e^{17}$, tapped to fit thereon. A plate, $e^{18}$, is fitted between the top and ends of the case, $e^{11}$, and provided with a hole to fit over the pin, $e^{16}$.

A series of blocks, preferably of wood, F, are fitted to the cases, $e^{11}$, and provided upon their under surfaces, which are shaped to the different portions of the molding desired, with sandpaper, $f$, secured thereupon by any suitable means as, for instance, saw-kerfs, $f'$, in which the edges of the sandpaper are clamped. These blocks are provided with notches cut in from their upper edges, $f^2$, to receive the pin, $e^{16}$, and are slipped upward into the cases, $e^{11}$, and clamped tightly therein by means of the plate $e^{18}$, and its clamping nut.

In operation, a series of blocks are prepared with under surfaces fitted to the faces or portions thereof of whatever molding it is necessary to finish; sandpaper is applied to these surfaces, and the blocks are then secured in the block-holders and the latter in the box, D, carried by the reciprocating frame, C. The blocks are then adjusted vertically and laterally until in the proper position to work upon the molding which is fed through the machine.

To securely hold the molding upon the bed of the machine when badly warped, I provide a series of adjustable and detachable rollers shown best in Figs. 13, 14 and 15. These rollers, G, are preferably made of rubber and journaled upon a pin, $g$, in a yoke, $g'$, having a squared upwardly projecting shank, $g^2$. To secure the rollers, in place, a clamping device, H, is provided having a notch, $h$, extending upward from its under surface and of sufficient size to receive both the shanks, $g^2$, of the roller and one of the cross bars, $d^{18}$, of the adjustable box, D. A hole, $h'$, extends from the notch, $h$, to the upper surface of the clamp and is large enough to receive the shank, $g^2$, of the roller. A set screw, $h^2$, is threaded in the side of the clamp and adapted to be screwed up upon the parts within the same. The application of the roller and the box, D, is shown in Figs. 1, 3 and 15, and said rollers may be used upon any or all of the cross pieces of the box.

I claim as new and desire to secure by Letters Patent—

1. The combination in a machine of the class described, of a suitable bed frame provided with guiding and feeding devices, a reciprocating frame mounted in guides upon the bed frame and composed of cross pieces extending laterally beneath the bed, uprights upon the opposite sides of the latter and side pieces connecting said uprights upon the opposite sides of the bed, a vertically adjustable box mounted between said uprights and above the bed, connecting devices between said box and the portion of the reciprocating frame beneath the bed and gearing arranged at the latter point and applied to said connecting devices whereby the box may be raised or lowered from beneath the bed; substantially as described.

2. The combination in a device of the class described and with a suitable bed frame provided with guiding and feeding devices, of a reciprocating frame mounted in guides upon the bed frame and composed of cross pieces beneath the bed, uprights upon the opposite sides thereof and side pieces connecting said uprights at the sides of the bed, a vertically adjustable box supported between said uprights and above the bed, rods fast at one end in said box and engaging at the other end by means of screw-threads with thimbles tapped to receive them and journaled in the cross-pieces beneath the bed, gears upon the lower ends of said thimbles and connecting gearing between said gears whereby they may be all rotated simultaneously by means of a single handle; substantially as described.

3. The combination in a machine of the class described and with a suitable bed frame, guiding and feeding devices applied thereto, a reciprocating frame moved back and forth upon said bed by suitable driving mechanism and a vertically adjustable box mounted upon said reciprocating frame and arranged above the bed of the machine, of cross rods removably clamped at their opposite ends to the sides of said box and a block-holding device supported by said rods and adjustable thereon, and clamping devices to secure said block-holder in any desired position upon the rods; substantially as described.

4. In a machine of the class described, and in combination with a bed frame and mechanism for feeding and guiding the molding and for imparting a longitudinally reciprocating motion over the bed, a reciprocating block-holding device suitably supported and consisting of a head, a block-holding case having three pins one of which is screw-threaded and all of which are adapted to move vertically in said head, a series of springs interposed between the head and the case and a nut applied to the screw-threaded pin to draw the case toward the head; substantially as described.

5. In a machine of the class described and in combination with a suitable bed frame and mechanism for guiding and feeding the molding thereon and for imparting a longitudinally reciprocating motion, a reciprocating block-holder mounted thereon, and consisting of a laterally adjustable head, a block-holding case supported therefrom by means of a screw-threaded rod and guiding rods all vertically movable in the head, a nut upon the screw-threaded rod above the head, a cross bar arranged to slide vertically upon all the rods beneath the head, springs interposed between this cross bar and the head and a nut upon the screw-threaded rod arranged below the cross bar; substantially as described.

6. In a machine of the class described and in combination with a suitable bed frame and mechanism for guiding and feeding the molding and for imparting a longitudinally reciprocating motion, a reciprocating block-holding case mounted above the bed and adjustable both vertically and laterally thereupon, said case being substantially closed upon the top, both ends and one side and having a clamping plate upon the opposite side adapted to clamp a block tightly in the case; substantially as described.

7. In a machine of the class described and in combination with a suitable bed frame, mechanism for guiding and feeding the molding thereon and a longitudinally reciprocating box provided with driving gear adapted to move it back and forth above the bed, of a series of cross bars in said box, a clamping device adapted to engage with said cross bars and an elastic faced roller mounted in a yoke provided with a shank fitted to said clamping device whereby said roller may be supported from any of the cross bars of the reciprocating box; substantially as described.

CHAS. L. RUEHS.

Witnesses:
CHARLES O. SHERVEY,
A. I. H. EBBESER.